United States Patent [19]
Beard

[11] Patent Number: 5,542,184
[45] Date of Patent: Aug. 6, 1996

[54] TAPE MEASURE KNIFE ATTACHMENT FOR CUTTING DRYWALL

[76] Inventor: Jay T. Beard, 413 E. Poplar Ave., San Mateo, Calif. 94401

[21] Appl. No.: 529,874

[22] Filed: Sep. 18, 1995

[51] Int. Cl.$^6$ .................................................. G01B 3/10
[52] U.S. Cl. .................. 30/293; 33/42; 33/668; 33/770; 7/163
[58] Field of Search ............................ 30/286, 289, 293, 30/294, 329; 7/163, 119, 164; 33/760, 770, 768, 668, 759, 42

[56] References Cited

U.S. PATENT DOCUMENTS

| | | | |
|---|---|---|---|
| 1,029,767 | 6/1912 | Remington | 33/760 |
| 2,461,444 | 2/1949 | Sanders | 30/31 |
| 2,591,333 | 4/1952 | Bellmer | 33/770 |
| 2,818,644 | 1/1958 | Crawford | 30/293 |
| 2,952,025 | 9/1960 | Johnson | 7/14.1 |
| 3,068,569 | 12/1962 | Campbell, Jr. | 30/294 |
| 4,255,856 | 3/1981 | Mackie | 30/293 |
| 4,903,409 | 2/1990 | Kaplan et al. | 30/293 |
| 4,949,462 | 8/1990 | Spencer | 30/293 |
| 4,993,093 | 2/1991 | Goldwitz | 7/163 |
| 5,035,054 | 7/1991 | Ellenberger | 30/233 |
| 5,048,189 | 9/1991 | Aurness et al. | 30/293 |
| 5,083,375 | 1/1992 | Helm, Sr. | 30/294 |
| 5,206,965 | 5/1993 | Rowley | 7/119 |
| 5,231,764 | 8/1993 | Chang | 30/293 |
| 5,289,637 | 3/1994 | Coffey | 30/294 |
| 5,295,308 | 3/1994 | Stevens et al. | 33/770 |
| 5,349,760 | 9/1994 | DeVito | 33/760 |
| 5,430,952 | 7/1995 | Betts | 33/760 |

FOREIGN PATENT DOCUMENTS

2203839  10/1988  United Kingdom .

*Primary Examiner*—Hwei-Siu Payer
*Attorney, Agent, or Firm*—Law Office of Albert J. Dalhuisen

[57] ABSTRACT

The present invention provides for cutting devices used in conjunction with a flexible measuring tape to cut drywall. The end segment and angled tab of the measuring tape are retained between two body components of a unit having an extended knife blade. Optionally, a guide unit is provided for attachment to the measuring tape in order to guide the cutting device in the preparation of cuts of uniform width and sufficient cutting depth to break the sheet along the cut.

21 Claims, 6 Drawing Sheets

TAPE MEASURE KNIFE ATTACHMENT FOR CUTTING DRYWALL

FIELD OF THE INVENTION

The present invention relates to cutting devices for cutting sheet materials. More particularly, the invention relates to hand held cutting devices for cutting rigid sheet materials such as drywall and the like. Still more particularly, the current invention relates to hand held cutting devices for sheet materials, wherein the cutting devices are adapted for use with a tape measure.

BACKGROUND OF THE INVENTION

Sheet materials such as drywall are commonly used for wall cladding in the construction of building and houses. These sheet materials are usually supplied in selected sizes, such as 4 feet×8 feet. When installing these sheets it is often necessary to cut strips of uniform width and this is generally accomplished by using a knife, such as a utility knife, in conjunction with a measuring tape. The end of the tape measure is held against the side of the utility knife with the thumb and the tape is extended across the sheet to the a desired width, holding the tape reel against the edge of the sheet. With the tape reel or casing held in one hand and the knife in the other, both hands are moved down the sheet simultaneously such that the knife scores a line parallel to the edge of the sheet. The final cut is then made without the tape measure by using the knife along the scored line. The sheet is subsequently bent along the scored and cut line until it breaks, resulting in a strip of the desired width.

Generally, it is not feasible to apply sufficient pressure to the knife to make the required cut in one pass across the sheet when using the above described method. Also, problems are frequently encountered when simultaneously measuring and cutting in the manner described above, such as for example, slippage of the cutting blade or inaccurate cutting or scoring. These problems can result in wasted time and materials thus adding to the construction cost.

The problems described above are well known in the art and various devices and methods have been designed by others attempting to solve these problems. For example, U.S. Pat. No. 5,206,965 (Rowley, 1993) discloses a knife having a housing with a thumb positioning structure associated with elongated sides. A measurement means is held in place against the thumb positioning structure by the user's thumb. U.S. Pat. No. 4,993,093 (Goldwitz, 1991) discloses a utility knife having an elongated slot extending in the same plane as the cutting blade. The angled tip of a flexible ruler is retained within the elongated slot. U.S. Pat. No. 4,949,462 (Spencer, 1990) discloses a drywall device which includes a sleeve for slidably mounting on a stem of a T-square. A clamping device is mounted on the sleeve for retaining the sleeve on the T-square. A knife holder containing a knife is joined with the sleeve of the '462 patent. U.S. Pat. No. 4,903,409 (Kaplan et al., 1990) discloses a drywall scribing and scoring tool which includes a knife holding unit and scribe units for attachment along an arm of a T-square. U.S. Pat. No. 4,255,856 (Mackie, 1981) discloses a utility knife having an attachment which permits the tape of a tape measure to be directly coupled to the knife. U.S. Pat. No. 2,952,025 (Johnson, 1960) discloses a knife which includes a reel containing a measuring tape and a guide structure at the outer end of the tape.

Known cutting devices, as exemplified by the above referenced patents, do not provide an optimal design combining ease of use, cutting accuracy, and small size. For example, the cutting devices described in the '965, '093, '856 and '025 patents utilize knives generally known as utility knives where the user holds a knife handle. When using such a utility knife, force is applied to the knife blade mainly by the user's wrist since the knife handle is held in the palm of the user's hand while the blade extends from the handle. In other words, the user is generally unable to push down directly on the cutting tip of the knife blade. Such placement of a cutting knife as an extension of a hand held handle may result in cutting inaccuracies because the user may twist or turn the handle while scoring or cutting the sheet.

The '462 and '409 patents utilize T-squares. It is well known to those skilled in the art that the users of drywall cutting devices prefer that these devices are small to easily fit in a user's pocket or tool belt, enabling the user to move unencumbered on a construction job site. T-squares for use with drywall cutting devices commonly have a relatively long arm or stem thus not fitting in the user's pocket and generally unsuitable for a tool belt.

Accordingly, the need exists for a drywall cutting device having improved ease of use and improved cutting accuracy.

SUMMARY OF THE INVENTION

The present invention provides novel cutting devices for drywall, wherein the devices are used in conjunction with a flexible measuring tape.

In one embodiment the current invention provides cutting devices including two bodies which are adapted for attachment to each other while engaging the end section of a measuring tape therebetween, and from which a knife blade is extended.

In another embodiment the current invention provides cutting devices including a cutting unit and a guide unit wherein the cutting unit comprises an extended knife blade and two bodies which are adapted for attachment to each other while engaging the end section of a measuring tape, and wherein the guide unit comprises two bodies which are adapted for attachment to each other and for engaging the tape measure therebetween.

In still another embodiment the present invention provides a cutting device wherein the end section of a flexible measuring tape is engaged in between two bodies of a unit having an extended knife blade.

In yet another embodiment the current invention provides a cutting device wherein a flexible measuring tape is attached to a cutting unit and a guide unit, wherein the cutting unit comprises an extended knife blade and two bodies-which are attached to each other with the end section of the measuring tape engaged therebetween and wherein the guide unit comprises two bodies which are attached two each other with the measuring tape disposed therebetween.

DETAILED DESCRIPTION OF THE INVENTION

While describing the invention and its embodiments, certain terminology will be utilized for the sake of clarity. It is intended that such terminology include not only the recited embodiments but all equivalents which perform substantially the same function, in substantially the same manner to achieve substantially the same result.

It will be understood that the term drywall as defined herein includes rigid sheet materials consisting of a core of gypsum or plaster of Paris which is sandwiched between layers of paper. These sheet materials are also known as plasterboard, wallboard, gypsum board, rock lath and sheetrock.

The term flexible measuring tape includes all flexible measuring tapes having an angled tab (also known as an end fitment) at the leading edge of the measuring tape. The leading edge of a measuring tape is defined herein as the edge from which measurements are made. Commonly, flexible measuring tapes are contained within a housing or casing from which the tape is extended to make measurements.

The present invention utilizes knife blades such as the conventional replaceable knife blades, these are well known to those skilled in the art. Typically, these blades have a cutting edge along one edge of the blade which ends in a sharp tip. An example of a knife blade suitable for use with the embodiments of the present invention is a parallelogram shaped blade having sides of about ⅜ inch and about ¾ inch length wherein a ⅜ inch side is sharpened for cutting.

Figure 1:
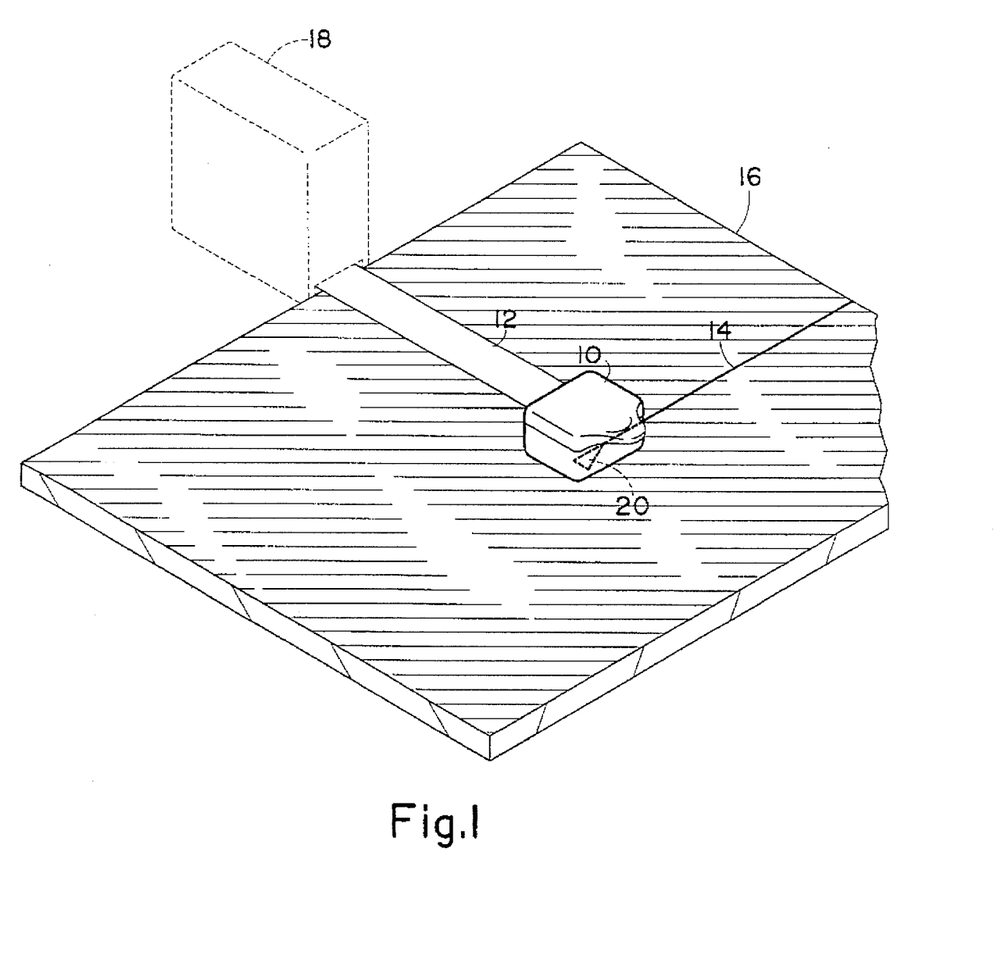
FIG. 1 is a schematic perspective view illustrating a cutting device of the present invention used in conjunction with a flexible tape measure for cutting drywall.

One embodiment of the present invention is illustrated in FIG. 1, showing drywall cutting device 10 used in conjunction with a conventional flexible measuring tape 12 to make a cut 14 in drywall sheet 16. Tape measure 12 is shown with casing 18. Cutting device 10 is equipped with a knife blade 20 which extends from the bottom surface of device 10.

Figure 2:
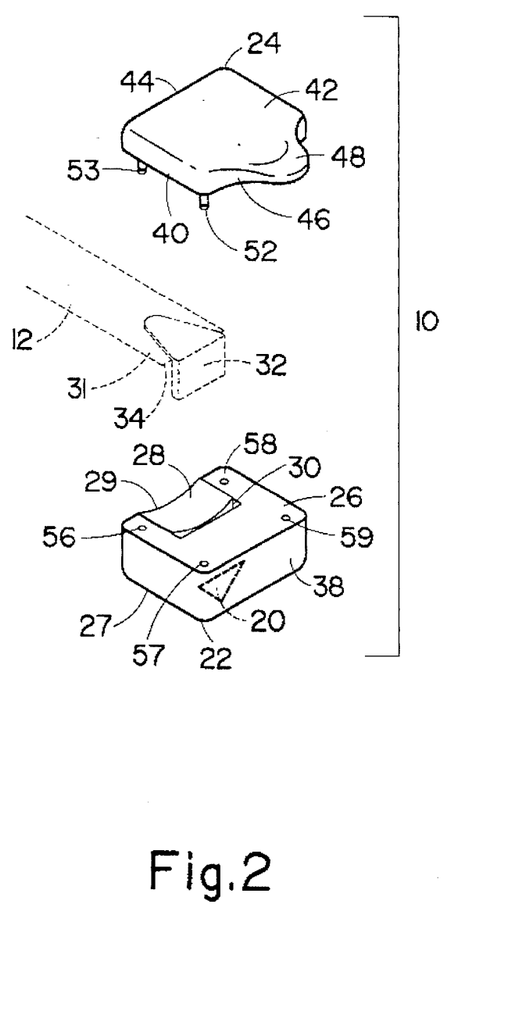
FIG. 2 is an exploded schematic perspective view of the cutting device illustrated in FIG. 1.

A more detailed view of device 10, adapted for use with measuring tape 12, is provided in FIG. 2. Device 10 includes a first body (or portion) 22 and a second body (or portion) 24. Body 22 has a first surface 26 and a second surface 27 opposing surface 26, wherein surface 27 faces the drywall. First surface 26 has a groove 28 extending from first forward end 29 of body 22. This groove is designed to fit a first end section 31 of measuring tape 12, wherein the first end section is defined as the tape length which equals the length of groove 28. Typically, the length of the tape first end section (and thus the length of groove 28) ranges from about ½ inch to about 1 ½ inch, a preferred length is about 1 inch. Generally, flexible measuring tapes have a curved cross sectional shape. Preferably, groove 28 matches the cross sectional shape of the measuring tape, as shown in FIG. 2, but it is not essential that the groove exactly matches the shape of the tape since these tapes can be deformed fairly easily to fit a cross section which is somewhat different from the cross sectional shape of the measuring tape.

Figure 3:
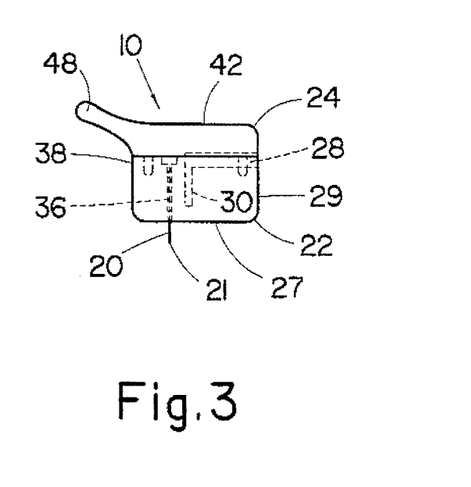
FIG. 3 is a schematic side elevation view of the cutting device illustrated in FIG. 1.

As shown in FIGS. 2 and 3, a slot 30 is provided in first surface 26 at the end of groove 28. Slot 26 is provided to receive angled tab 32 of measuring tape 12, wherein the angled tab 32 is positioned at the leading edge 34 of tape 12. Knife blade 20 extends from second surface 27 of body 22 with its sharp tip 21 pointing away from surface 27. Blade 20 is positioned in a slot 36, which is positioned between slot 30 and first rearward end 38 of body 22, wherein slot 36 is substantially perpendicular to the longitudinal axis of the first body. The section of knife blade 20 which projects from body 22 is referred to as the cutting end of the knife blade. This cutting end is at least 1/16 inch long.

Returning to FIG. 2, body 22 has a longitudinal axis which is substantially parallel to surfaces 26 and 27. The longitudinal axis of groove 28 is substantially parallel to the longitudinal axis of body 22. Body 24 has a third surface 40 for contacting surface 26 of body 22. A fourth surface 42 of body 24 opposes surface 40. When device 10 is used for cutting drywall, surface 42 faces the user. Body 24 has a second forward end 44 proximate first forward end 29, and a second rearward end 46 which is proximate first rearward end 38 when body 22 is attached to body 24. As shown in FIGS. 2 and 3, a protrusion 48 extends from surface 42. This protrusion is a handle to be held by the operator, preferably between thumb and index finger, when using the device.

As illustrated in FIG. 3, slot 36 retains knife blade 20. Slot 36 is not positioned in the same as plane as slot 30. The distance between slots 30 and 36 ranges from about 1/16 inch to about 3/16 inch. Preferably, this distance is about ⅛ inch. It is well known to those skilled in the art that the edges of drywall sheets are rough and as a result a drywall installer typically needs to add about ⅛ inch to the required width in order to compensate for edge roughness. The present invention automatically compensates for the addition of ⅛ inch to the required width.

Body 22 is attached to body 24 by an attaching means comprising four attachment tabs and four matching tab holes. FIG. 2 shows attachment tabs 52 and 53 protruding from surface 40 of body 24. Two additional attachment tabs (not shown) protrude from surface 40. Four tab holes 56, 57, 58 and 59 are provided in surface 26 of body 22. The attachment tabs are designed to be snugly fitting in the matching tab holes to align surface 26 with surface 40 and to attach body 22 to body 24. While FIG. 2 illustrates the use of four attachment tabs, the invention is equally operable when using at least two attachment tabs protruding from surface 40 into two matching tab holes in surface 26. Also, the invention is equally operable when the attachment tabs protrude from surface 26 while the matching tab holes are positioned in surface 40. Positioning of the attachment tabs and matching tab holes is not critical provided these do not interfere with the placement of the measuring tape and the knife blade.

Figure 4:
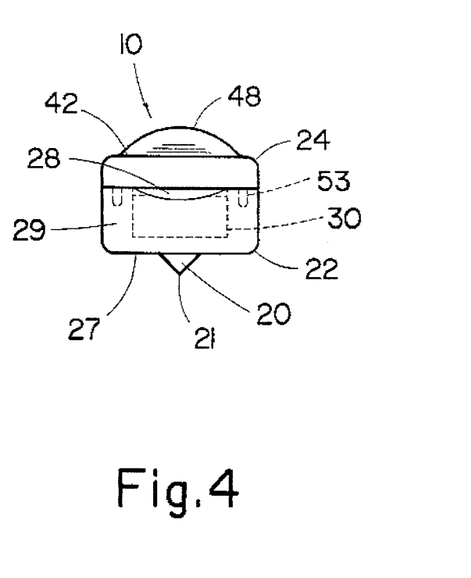
FIG. 4 is a schematic front elevation view of the cutting device illustrated in FIG. 1.
Figure 5:
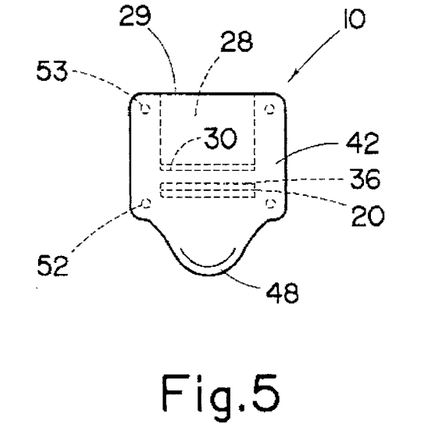
FIG. 5 is a schematic plan view of the cutting device illustrated in FIG. 1.
Figure 6:
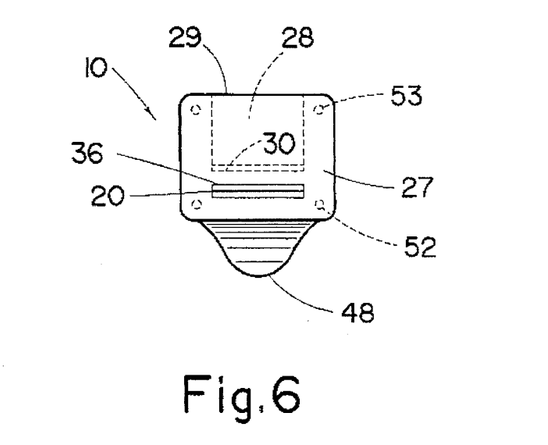
FIG. 6 is a schematic bottom view of the cutting device illustrated in FIG. 1.

First body 22 and second body 24 can be produced using such materials as plastics or metals. Preferably, these bodies are made of injection molded plastics. Additional views of device 10 are provided in FIGS. 4, 5 and 6.

Figure 7:
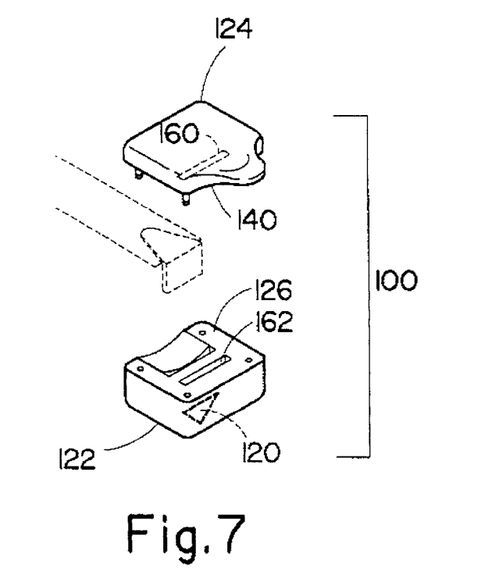
FIG. 7 is an exploded schematic perspective view illustrating an alternate embodiment of the device of FIG. 1.
Figure 8:
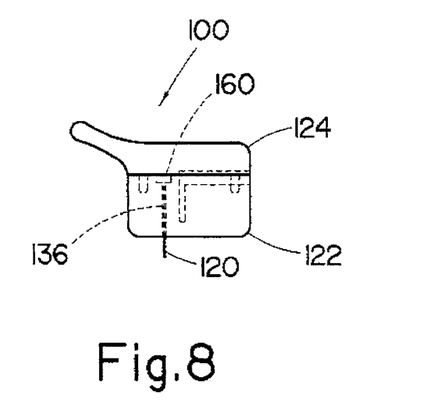
FIG. 8 is a schematic side elevation view of the cutting device illustrated in FIG. 7.

FIGS. 7 and 8 illustrate drywall cutting device 100 which is an alternate embodiment of the present invention. Cutting device 100 is similar to device 10 except that device 100 is provided with a separate means to prevent knife blade 120 from cutting into body 122 or body 124 when the user puts pressure on the device while cutting drywall. This means comprises a strip, bar or protrusion 160 which is affixed to surface 140 of body 124. A slot 162 in surface 126 of body 122 is a continuation of knife blade slot 136. Slot 162 is designed to receive bar 160 when body 122 is affixed to body 124, thus preventing knife 120 from cutting into body 122 or body 124, and providing a firm surface for exerting pressure on the knife blade.

Figure 9:
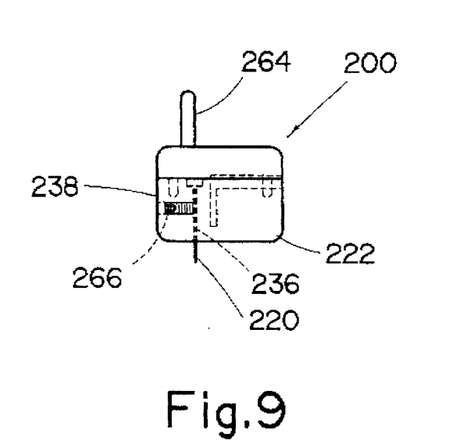
FIG. 9 is a schematic side elevation view of an additional alternate embodiment of the cutting device illustrated in FIG. 1.

Alternate cutting device 200 illustrated in FIG. 9 shows two optional modifications of device 10. In the first optional modification, protrusion 264 of device 200 is used instead of protrusion 48 of device 10 (FIG. 2). The modified handle protrusion 264 provides a different grip than handle protrusion 48 which some users might find beneficial. In the second optional modification a fastening means is provided for fastening knife blade 220 into slot 236 of body 222. This fastening means comprises a fastening screw 266 or bolt which is threadably engaged in body 222 such that the screw extends from first rearward end 238 into slot 236. A preferred fastening screw is an allen screw.

Figure 10:
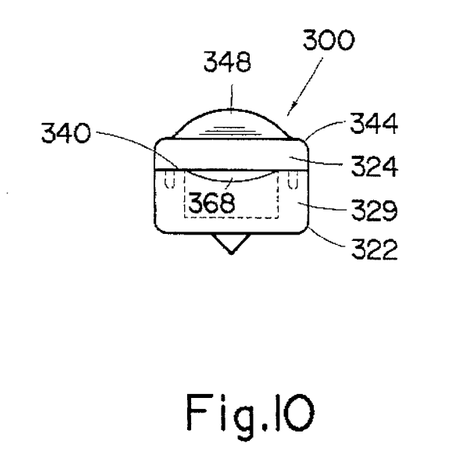
FIG. 10 is a schematic front elevation view of a further alternate embodiment of the cutting device illustrated in FIG. 1.

Cutting device 300 is an additional alternate embodiment of the present invention as illustrated in FIG. 10, which provides a view of the forward end 329 of body 322 and the forward end 344 of body 324. This view also shows handle protrusion 348. Device 300 provides a modification of surface 340 of body 344. In this modification, surface 340 has a segment 368 which is shaped to fit the curved cross sectional shape of a conventional flexible measuring tape.

Figure 11:
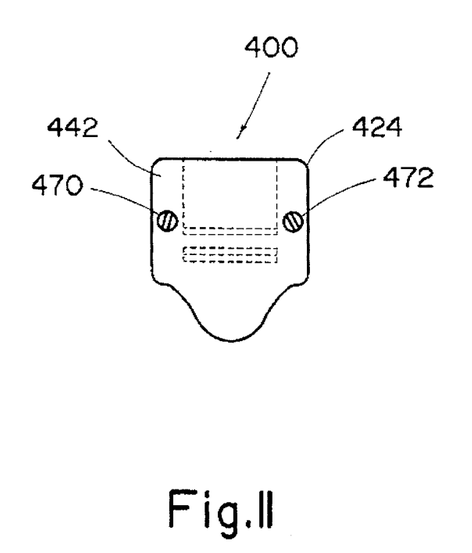
FIG. 11 is a schematic plan view illustrating a further alternate embodiment of the device illustrated in FIG. 1.
Figure 12:
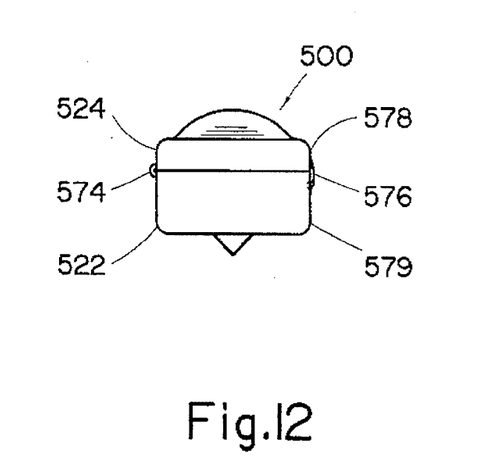
FIG. 12 is a schematic front elevation view illustrating yet another alternate embodiment of the device illustrated in FIG. 1.

Alternate cutting devices 400 and 500 shown in FIGS. 11 and 12 respectively illustrate alternate attaching means for attaching the first body to the second body without the use of attachment tabs and tab holes. In device 400 attaching screws or bolts 470 and 472 extend from surface 442 through second body 424 and threadably engaging the first body which contains the knife blade. While two attaching screws are preferred, the invention is equally operable using one or more attaching screws. Positioning of the attaching screws is not critical provided these screws do not interfere with the placement of the measuring tape and the knife blade. In device 500 (FIG. 12) a hinge 574 provides a hinging attachment of body 522 to body 524 along one side of device 500. Along the opposite side of this device a metal strip 576 is attached to side 578 of body 524. Strip 576 provides a frictional fit against side 579 of body 522. Various alternate configurations of fastening means are operable with the present invention, such as for example metal strips similar to strip 576 along both sides of the device, or a hinge combined with an attaching screw (also referred to as a hinged unit screw).

Figure 13:
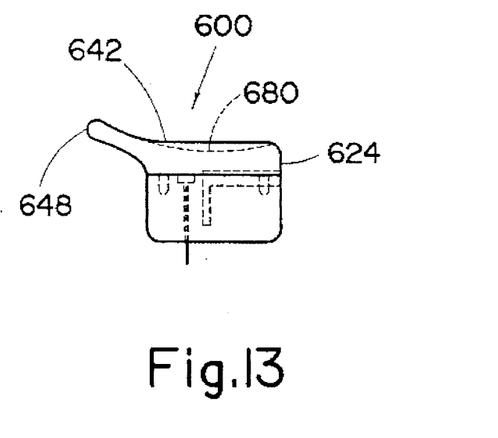
FIG. 13 is a schematic side elevation view illustrating another alternate embodiment of the device illustrated in FIG. 1.
Figure 14:
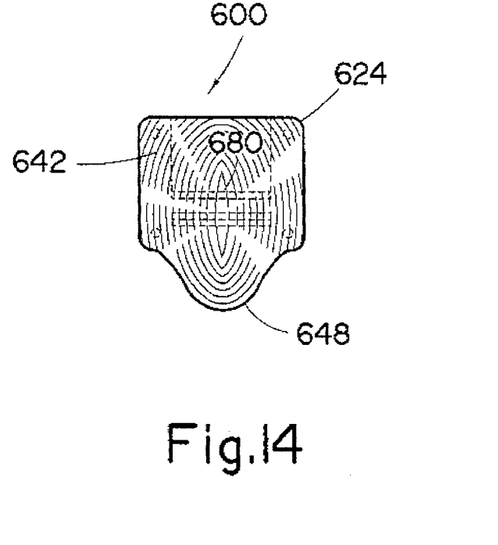
FIG. 14 is a schematic plan view of the cutting device illustrated in FIG. 13.

An additional alternate embodiment of cutting device 100 is illustrated in device 600, as depicted in FIGS. 13 and 14. In device 600 a concave region 680 is provided in surface 642 adjacent to handle protrusion 648 of body 624. This concave region allows the user of the cutting device to obtain a firmer grip on the device.

Figure 15:
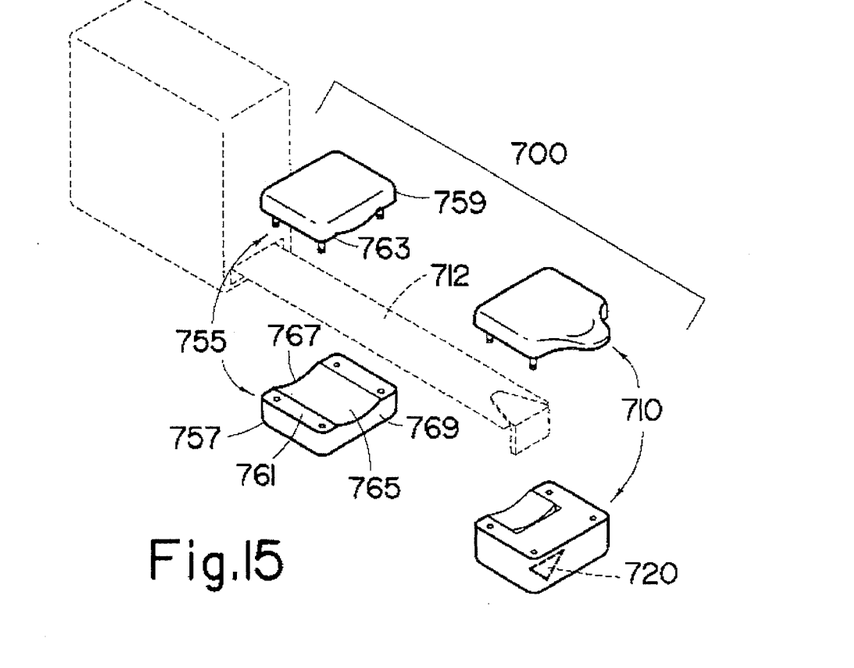
FIG. 15 is an exploded schematic perspective view of an alternate cutting device of the present invention utilizing a guide unit.
Figure 16:
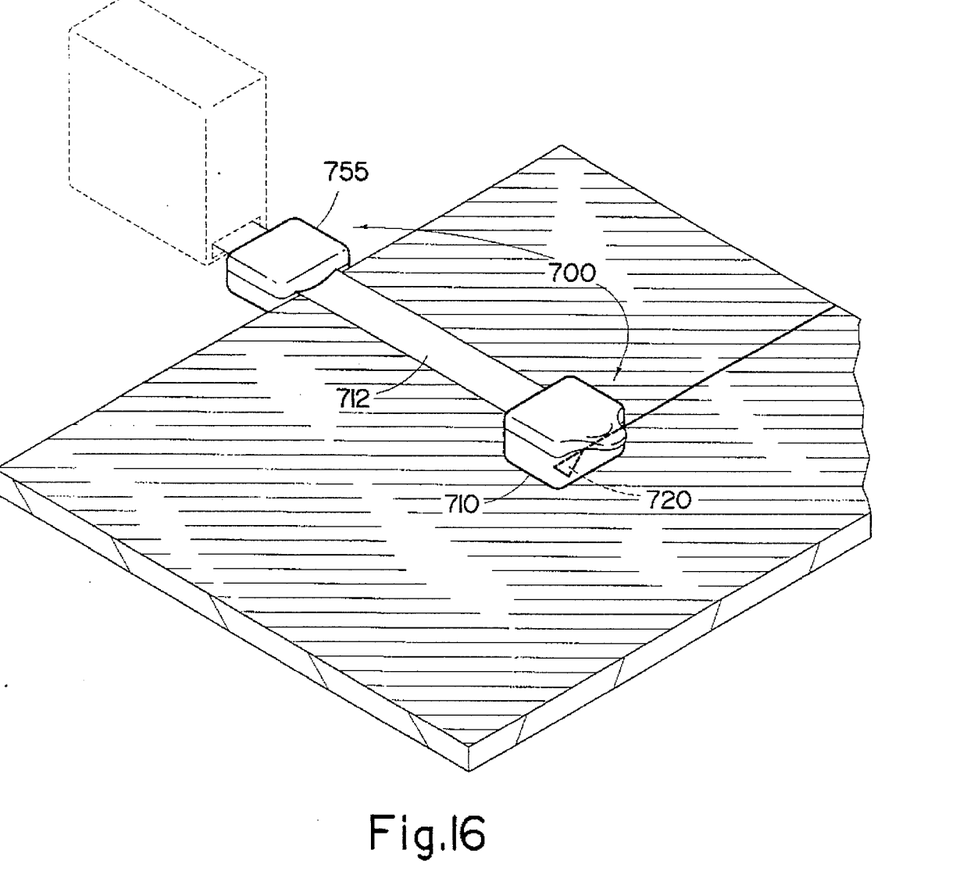
FIG. 16 is a schematic perspective view illustrating the device of FIG. 15 employed for cutting drywall.

Drywall cutting device 700, a further alternate embodiment of the present invention, is illustrated in FIGS. 15 and 16. Device 700 includes a cutting unit 710 and a guide unit 755. Cutting unit 710 containing knife blade 720 is adapted for receiving flexible measuring tape 712. Cutting unit 710 is similar to device 10 (FIGS. 1 and 2) and includes the alternate designs illustrated in connection with devices 100, 200, 300, 400, 500 and 600.

Guide unit 755 includes a third body 757 and a fourth body 759. Body 757 and body 759 are adapted for receiving measuring tape 712 therebetween when these bodies are coupled to each other. Body 757 has a surface 761 which faces surface 763 of body 759. Surface 761 is provided with a groove 765 along its entire length from forward end 767 to rearward end 769, wherein groove 765 is substantially parallel to the longitudinal axis of body 757. Preferably, the cross sectional shape of groove 765 matches the cross sectional shape of the bottom of the measuring tape. Surface 763 is designed to match the shape and size of surface 761. Preferably, the cross sectional configuration of surface 763 matches the cross sectional shape of the top of measuring tape 712. Flexible measuring tapes commonly have a convex cross sectional bottom shape and a concave cross sectional top shape. Thus a concave cross sectional shape is preferred for groove 765 of body 757 and a convex cross sectional shape is preferred for the region of surface 763 which is adapted for contacting the measuring tape.

The coupling means for guide unit 755 are similar to the attaching means described in connection with devices 100, 200, 300, 400, 500 and 600. These coupling means include combinations of attachment tabs and tab holes (as illustrated in FIG. 16), screws, hinges and one or more metal strips along one or both sides of guide unit 755.

An additional alternate embodiment of a cutting device of the present invention includes device 10 and a flexible tape measure such as tape 12 (see FIG. 1) wherein tape 12 is attached to device 10 by placing the tape first end in the groove of the first body, while fitting the angled tab in the slot at the end of the groove and then attaching the first body to the second body. Further alternate embodiments include the various modifications and options which are illustrated in connection with devices 100 through 600.

An alternate embodiment of a cutting device of the present invention includes device 700 and a flexible tape measure such as tape 712 (see FIG. 16) wherein tape 712 is affixed to device 700 by securing the tape first end in cutting unit 710, as described in connection with the above described embodiment comprising device 10 and tape 12. Additionally, guide unit 755 is fitted onto the tape by coupling body 757 onto body 759 with tape 712 disposed in between these bodies in groove 765.

Drywall is cut with the various cutting devices of the present invention in the following manner. The first end of the measuring tape is placed in the groove of the first body while the angled tab is placed in the slot at the end of the groove. The first body is then attached to the second body. The tape is extended across the drywall sheet to the desired width for cutting. When devices without a guide unit are used, the tape casing is placed against the edge of the sheet and the tape is preferably locked in the housing. The user holds the tape casing with one hand while holding the handle protrusion of the cutting device with the other hand. Tape casing and cutting device are moved along the drywall sheet while pressing the knife blade into the sheet to form a cut as shown schematically in FIG. 1. If a guide unit such as in device 700 is used, the guide unit is held abutting the edge of the sheet (FIG. 16). Alternately, if a casing or a guide unit are not used, the user can hold the tape with the hand, placing a finger or the hand against the edge of the sheet.

It has been found that the cutting devices of the present invention enable the user to exert sufficient pressure on the knife blade to form a cut of adequate depth in a single pass to permit the sheet to be broken along the cut line. It has also been found that the cutting devices of the present invention result in improved cutting accuracy as compared with devices using utility knifes. Additionally, the devices of the present invention are small and highly portable, unlike drywall cutting devices utilizing T-squares. Importantly, the methods by which the cutting devices of the present invention are affixed to the flexible measuring tape do not use clamping mechanisms such as screws which are forced onto the surface of the tape, since screws which are forced into contact with a flexible tape are known to permanently deform and mar the tape.

The invention has been described in terms of the preferred embodiment. One skilled in the art will recognize that it would be possible to construct the elements of the present invention from a variety of means and to modify the placement of components in a variety of ways. While the preferred embodiments have been described in detail and shown in the accompanying drawings, it will be evident that various further modifications are possible without departing from the scope of the invention as set forth in the following claims.

I claim:

1. A device for cutting drywall, wherein the device is adapted for use with a flexible measuring tape, in which the cutting device comprises:
   a) a knife blade having predetermined dimensions and having a cutting end;
   b) a first body having (1) a first longitudinal axis, (2) a first forward end, (3) a first rearward end opposing the first forward end, (4) a first side, (5) a second side opposing the first side, (6) a first surface substantially parallel to the first longitudinal axis wherein the first surface has a measuring tape positioning structure adapted for receiving a first end section of the measuring tape, in which the positioning structure extends from the first forward end, (7) a second surface opposing the first surface wherein the second surface has a first region defining a first slot retaining the knife blade such that the cutting end of the knife blade extends a predetermined length from the second surface, in which the first slot is positioned proximate the first rearward end;
   c) a second body attached to the first body wherein the second body has (1) a second forward end proximate the first forward end, (2) a second rearward end proximate the first rearward end, (3) a third side proximate the first side, (4) a fourth side proximate the second side, (5) a third surface contacting the first surface and (6) a fourth surface opposing the third surface wherein the fourth surface has a handle protrusion; and
   d) an attaching means for attaching the first body to the second body.

2. The cutting device according to claim 1 wherein the positioning structure comprises a second region defining a first groove adapted for receiving the first end section of the measuring tape in which the first groove extends substantially parallel to the first longitudinal axis to a third region defining a second slot adapted for receiving an angled tab of the measuring tape first end section.

3. The cutting device according to claim 2 wherein the first end section of the measuring tape has a predetermined length ranging from about ½ inch to about 2 inches.

4. The cutting device according to claim 2 wherein the first slot is positioned in a plane substantially perpendicular to the first longitudinal axis and in which the first slot is positioned between the second slot and the first rearward end, wherein the distance between the first slot and the second slot ranges from approximately 1/16 inch to approximately 3/16 inch.

5. The cutting device according to claim 4 wherein the distance between the first slot and second slot is approximately ⅛ inch.

6. The cutting device according to claim 4 additionally comprising a knife blade fastening means for fastening the knife blade in the first slot.

7. The cutting device according to claim 6 wherein the knife blade fastening means comprises a fastening screw which is threadably engaged in the first body such that the screw extends from the first rearward end into the first slot.

8. The cutting device according to claim 4 wherein the knife blade cutting end extends at least 1/16 inch from the second surface.

9. The cutting device according to claim 4 wherein the handle protrusion extends from the fourth surface proximate the second rearward end.

10. The cutting device according to claim 4 wherein the attaching means comprises:
    a) at least two attachment tabs protruding from the third surface, substantially perpendicular to the third surface; and
    b) regions defining tab holes in the first surface wherein the tab holes are adapted for receiving the third surface attachment tabs, whereby the first body is attached to the second body when the attachment tabs engage the tab holes.

11. The cutting device according to claim 4 wherein the attaching means comprises at least one attaching screw extending from the fourth surface through the second body and threadably engaging the first body.

12. The cutting device according to claim 4 wherein the attaching means comprises a hinge which is attached to the first side and to the third side, such that the hinge when opened permits placement of the first end section of the measuring tape on the measuring tape positioning structure and such that the hinge when closed causes the first surface to contact the third surface.

13. The cutting device according to claim 12 additionally comprising a hinged unit screw extending from the fourth surface through the second body and threadably engaging the first body.

14. The cutting device according to claim 12 additionally comprising a first metal strip attached to the fourth side wherein the first metal strip extends along the second side and frictionally engages the second side.

15. The cutting device according to claim 4 wherein the attaching means comprises:
    a) a first metal strip attached to the third side wherein the first metal strip extends along the first side and frictionally engages the first side; and b) a second metal strip attached to the fourth side wherein the second metal strip extends along the second side and frictionally engages the second side.

16. The cutting device according to claim 4 additionally comprising a guide which is adapted for positioning at a predetermined position along the measuring tape, wherein the guide comprises;

a) a third body having (1) a second longitudinal axis, (2) a fifth surface substantially parallel to the second longitudinal axis, wherein the fifth surface has a fourth region defining a second groove, in which the second groove is adapted for receiving the measuring tape;

b) a fourth body having a sixth surface for contacting the fifth surface; and c) a guide coupling means for coupling the third body to the fourth body.

17. The cutting device according to claim 4 additionally comprising a measuring tape having a first end section wherein the measuring tape first end section is in the positioning structure.

18. A device for cutting drywall comprising:

a) a flexible measuring tape having (1) a first end section, (2) a first end section leading edge, (3) an angled tab at the leading edge and (4) a casing;

b) a knife blade having predetermined dimensions and having a cutting end;

c) a first body having (1) a first longitudinal axis, (2) a first forward end, (3) a first rearward end opposing the first forward end, (4) a first side, (5) a second side opposing the first side, (6) a first surface substantially parallel to the first longitudinal axis wherein the first surface has a measuring tape positioning structure engaging the first end section of the measuring tape, in which the positioning structure extends from the first forward end, (7) a second surface opposing the first surface wherein the second surface has a first region defining a first slot retaining the knife blade such that the cutting end of the knife blade extends a predetermined length from the second surface, in which the first slot is positioned proximate the first rearward end;

d) a second body attached to the first body wherein the second body has (1) a second forward end proximate the first forward end, (2) a second rearward end proximate the first rearward end, (3) a third side proximate the first side, (4) a fourth side proximate the second side, (5) a third surface contacting the first surface and (6) a fourth surface opposing the third surface wherein the fourth surface has a handle protrusion; and e) an attaching means for attaching the first body to the second body.

19. The cutting device according to claim 18 wherein the positioning structure comprises a second region defining a first groove for engaging the first end section of the measuring tape in which the first groove extends substantially parallel to the first longitudinal axis to a third region defining a second slot for receiving the angled tab of the measuring tape first end section.

20. The cutting device according to claim 19 wherein the first slot is positioned in a plane substantially perpendicular to the first longitudinal axis and in which the first slot is positioned between the second slot and the first rearward end, wherein the distance between the first slot and the second slot ranges from approximately 1/16 inch to approximately 3/16 inch.

21. The cutting device according to claim 20 additionally comprising a guide which is adapted for positioning at a predetermined position along the measuring tape, wherein the guide comprises; a) a third body having (1) a second longitudinal axis, (2) a fifth surface substantially parallel to the second longitudinal axis, wherein the fifth surface has a fourth region defining a second groove, in which the second groove is adapted for receiving the measuring tape; b) a fourth body having a sixth surface for contacting the fifth surface; and c) a guide coupling means for coupling the third body to the fourth body.

* * * * *